(12) United States Patent
Kim

(10) Patent No.: US 8,276,986 B2
(45) Date of Patent: Oct. 2, 2012

(54) SEAT PAD THAT PROMOTES COOLING AND VENTILATION

(76) Inventor: Nahyun Kim, Forest Hills, NY (US)

( * ) Notice: Subject to any disclaimer, the term of this patent is extended or adjusted under 35 U.S.C. 154(b) by 0 days.

(21) Appl. No.: 13/011,885

(22) Filed: Jan. 22, 2011

(65) Prior Publication Data

US 2012/0187740 A1    Jul. 26, 2012

(51) Int. Cl.
*A47C 31/00* (2006.01)
(52) U.S. Cl. ........... 297/180.11; 297/180.1; 297/452.42; 297/452.45
(58) Field of Classification Search ............. 297/180.1, 297/180.11, 452.42, 452.43, 452.45, 452.46
See application file for complete search history.

(56) References Cited

U.S. PATENT DOCUMENTS

| | | | | |
|---|---|---|---|---|
| 1,339,611 A | * | 5/1920 | White | 297/452.43 |
| 1,489,308 A | * | 4/1924 | Cox | 297/452.43 |
| 1,593,066 A | * | 7/1926 | Gaston | 297/180.11 |
| 1,664,636 A | * | 4/1928 | Mayer | 297/180.11 |
| 1,922,228 A | * | 8/1933 | Brown | 267/145 |
| 2,804,912 A | * | 9/1957 | Pickard | 297/452.43 |
| 2,931,427 A | * | 4/1960 | Goldstein | 297/452.43 |
| 3,391,413 A | * | 7/1968 | Crane et al. | 297/452.45 |
| 4,189,180 A | * | 2/1980 | Klein | 297/452.45 |
| 4,997,230 A | * | 3/1991 | Spitalnick | 297/180.11 |
| 5,004,294 A | * | 4/1991 | Lin | 297/180.11 |
| 5,590,428 A | * | 1/1997 | Roter | 5/726 |
| 5,645,314 A | * | 7/1997 | Liou | 297/180.14 |
| 5,692,952 A | * | 12/1997 | Chih-Hung | 454/120 |
| 5,924,767 A | * | 7/1999 | Pietryga | 297/180.13 |
| 7,083,236 B1 | * | 8/2006 | Smith | 297/452.43 |
| 7,086,108 B1 | * | 8/2006 | Litvak | 5/723 |

* cited by examiner

*Primary Examiner* — Laurie Cranmer
(74) *Attorney, Agent, or Firm* — Louis F. Teran

(57) ABSTRACT

A seat pad that is injection molded out of plastic with various combinations of holes and pathways that promote air flow to ventilate and prevent the build-up of perspiration on a person's back, upper legs, and rear end as they sit on it for an extended period of time. The seat pad also has multiple beads that provide acupuncture-type pressure for relaxation and comfort of the person. The design of the seat pad is such that it provides some flexibility for cushioning effect and some rigidity so that it is not collapsed or crushed under the weight of the person sitting on it for an extended period of time.

1 Claim, 4 Drawing Sheets

SEAT PAD THAT PROMOTES COOLING AND VENTILATION

BACKGROUND OF INVENTION

1. Field of Invention

The present invention relates to the fields of seat supporting surfaces that keep sitting person comfortable and cool. More particularly, the present invention relates to a pad or cushion for vehicle seats that provide comfort and promotes airflow to maintain comfortable temperature.

2. Description of Prior Art

Typical seats used in automobiles, airplanes, and offices have cloth, vinyl, or leather surfaces on which a person directly sits. Whenever a person sits on a typical seat for any extended period of time, there is a build-up of perspiration on that person's back, upper legs, and rear end. This is especially true in vehicles where the interior upholstery becomes warm during periods of hot weather.

Several ventilated seat cushion devices have been developed to provide air ventilation to the person sitting directly on the seat cushion. U.S. Pat. No. 5,692,952 teaches an air-conditioned seat cushion having a top cushion with many protruded beads and supporting cylinders. The inlet on its rear end to be sewn and sealed with one containing having one filter net on its front surface and one blower inside it. The cool air drawn in by the blower will run in the air passages among the supporting cylinders inside the cushion and flow among the protruded beads on the cushion and then overflow from the air outlets spread on the cushion to provide prompt cool ventilation.

U.S. Pat. No. 5,924,767 teaches a ventilated seat cushion detachably connectable to a source of forced air within a motor vehicle to provide cooling and heating of an occupant of the seat cushion. The seat cushion is connectable to a source of forced air by a flexible air hose which is in fluid communication with an air intake manifold internally of the cushion that distributes forced air through a series of perforated plastic tubing members.

Other ventilated seat cushions are taught in U.S. Pat. No. 5,613,729, U.S. Pat. No. 5,372,402, U.S. Pat. No. 5,016,302, U.S. Pat. No. 2,931,286, U.S. Pat. No. 3,529,310, and U.S. Pat. No. 3,486,177.

The problem with the ventilated seat cushions in the prior art is that they are ventilated through forced airflow. The cushion systems are complicated and most require electrical power to energize an air generator that forces air to ventilate the occupant. What is needed is a seat pad or cushion that does not require electricity and harnesses the natural flow of air from its surroundings to ventilate the occupant.

In addition to lack of air ventilation, the cushion or foam of a typical seat has a tendency to lose its support after a period of time. When some of the support is lost, the seat becomes uncomfortable and can cause some back pain.

Therefore, it can be appreciated that there exists a continuing need for a new and improved seat pad or cushion that utilizes the natural flow of air to ventilate the occupant and is rigid enough to maintain its support over an extended period of time but flexible enough to be comfortable for the occupant. In this regard, the present invention substantially fulfills this need.

SUMMARY OF THE INVENTION

Accordingly, the present invention has been made in view of the above-mentioned disadvantages occurring in the prior art. The present invention is a seat pad fully injection molded using plastic material that provides some flexibility for cushion and some rigidity to ensure that it does not collapse or completely crush under the weight of a person sitting on it.

It is therefore a primary object of the present invention to provide a seat pad that prevents the build-up of perspiration on a person's back, upper legs, and rear end by promoting natural air flow that cools or ventilates that areas of the person that is in direct contact with the seat pad.

Another object of the present invention is to provide a seat pad that provides acupuncture-type pressure for relaxation and comfort of a person sitting on it for an extended period of time.

Yet another object of the present invention is to provide a seat pad that can be injection molded out of plastic without the need of any additional foam pads or cushions so as to minimize manufacturing costs and complexity.

The above objects and other features and advantages of the present invention, as well as the structure and operation of various embodiments of the present invention, are described in detail below with reference to the accompanying drawings.

DESCRIPTION OF THE DRAWINGS

The accompanying drawings which are incorporated by reference herein and form part of the specification, illustrate various embodiments of the present invention and, together with the description, further serve to explain the principles of the invention and to enable a person skilled in the pertinent art to make and use the invention. In the drawings, like reference numbers indicate identical or functional similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Reference will now be made to the drawings in which various elements of the present invention will be given numerical designations and in which the invention will be discussed so as to enable one skilled in the art and make use the invention.

Figure 3:
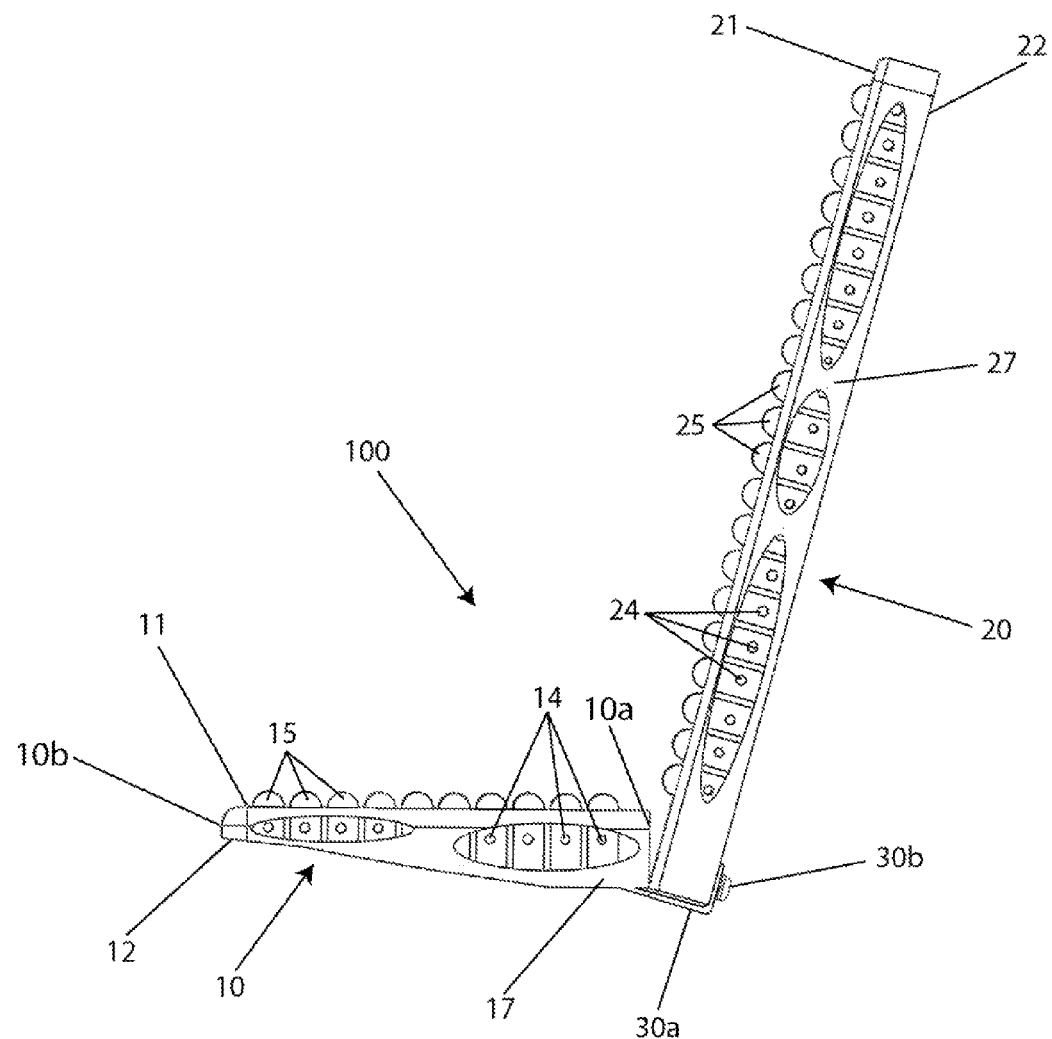
FIG. 3 is a side view of the seat pad of the present invention.
Figure 4:
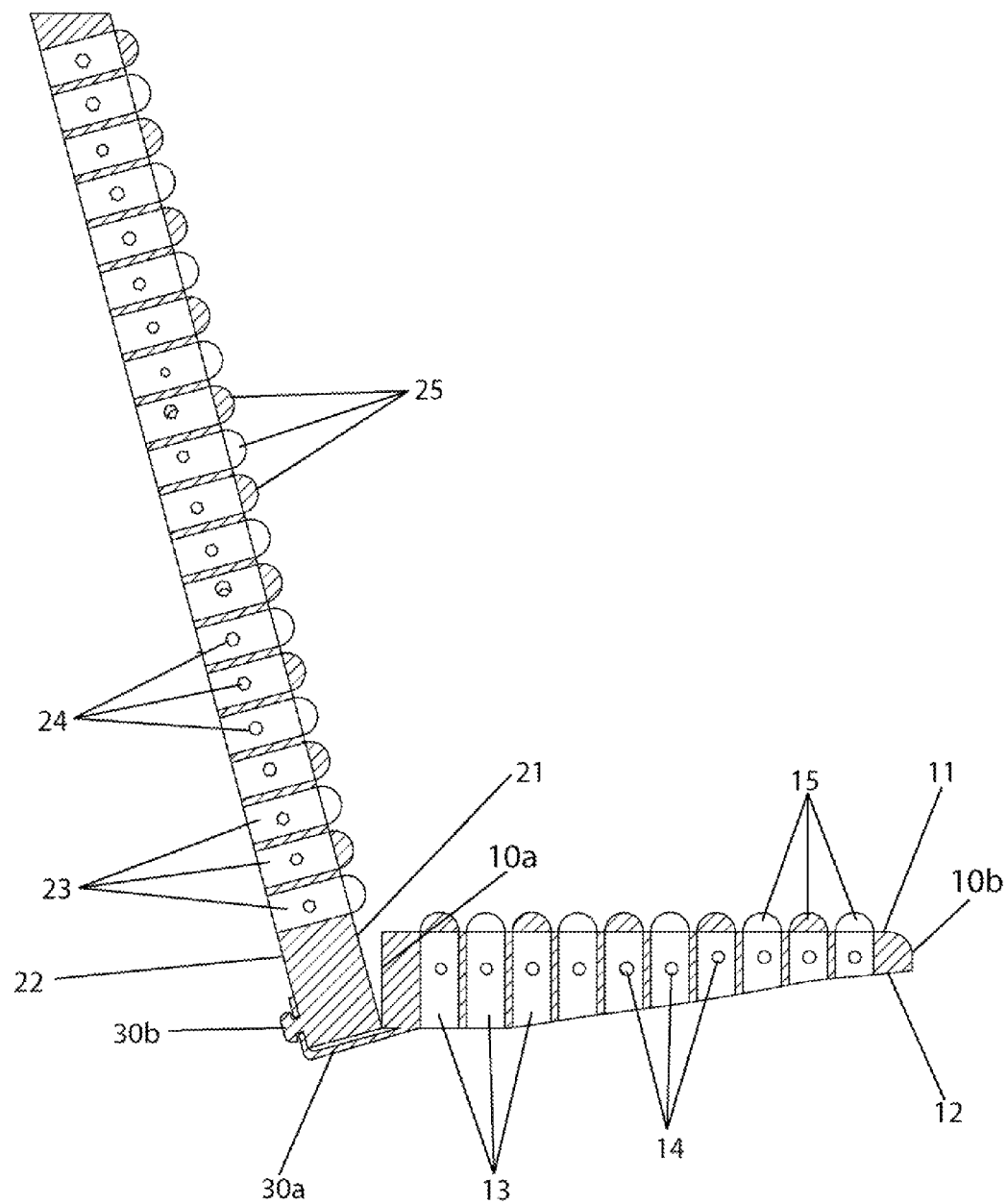
FIG. 4 is a sectional view of the seat pad of the present invention.

The present invention comprises a seat pad 100 with a bottom pad 10 and a top pad 20, both of which are manufactured out of plastic such as polypropylene or polyethylene. The top pad 20 is a single plastic part with a top face 21 and a bottom face 22. Throughout the top pad 20, there are multiple large holes 23 that extend from the top face 21 to the bottom face 22. Every other large hole 23 is covered by a protruded bead 25 that is semi-circular in shape. The beads 25 protrude from the top face 21 and cover about half of the large holes 23 in the top pad 20. The sidewalls 23a of each large hole 23 have a small hole 24 to allow air to flow between the various large holes 23. Finally, the top pad 20, as shown in FIGS. 1 and 3, has multiple side holes 26, which can be long and oval in shape, throughout the side edges.

Figure 1:
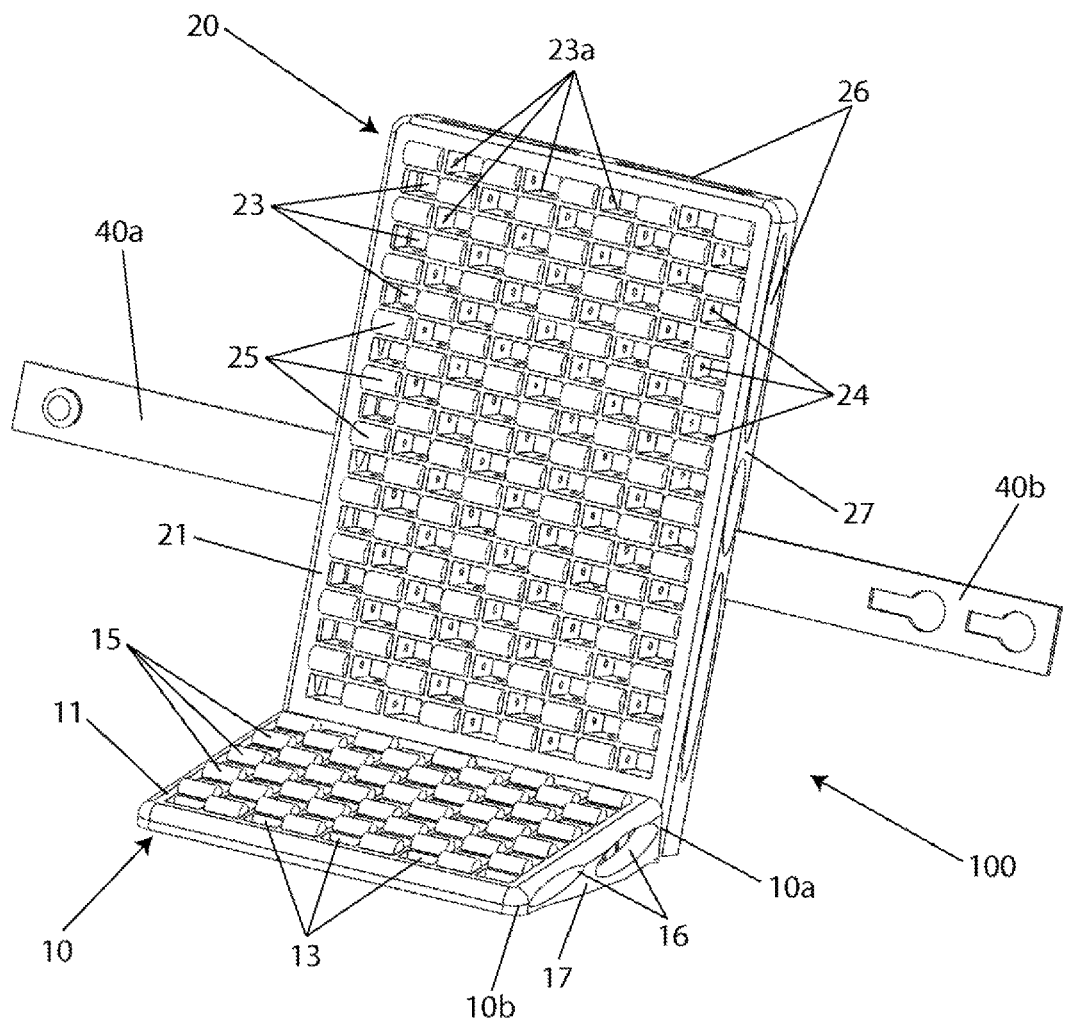
FIG. 1 is a perspective view of the front of the seat pad of the present invention in its assembled state as it would be installed on a typical seat or chair.
Figure 2:
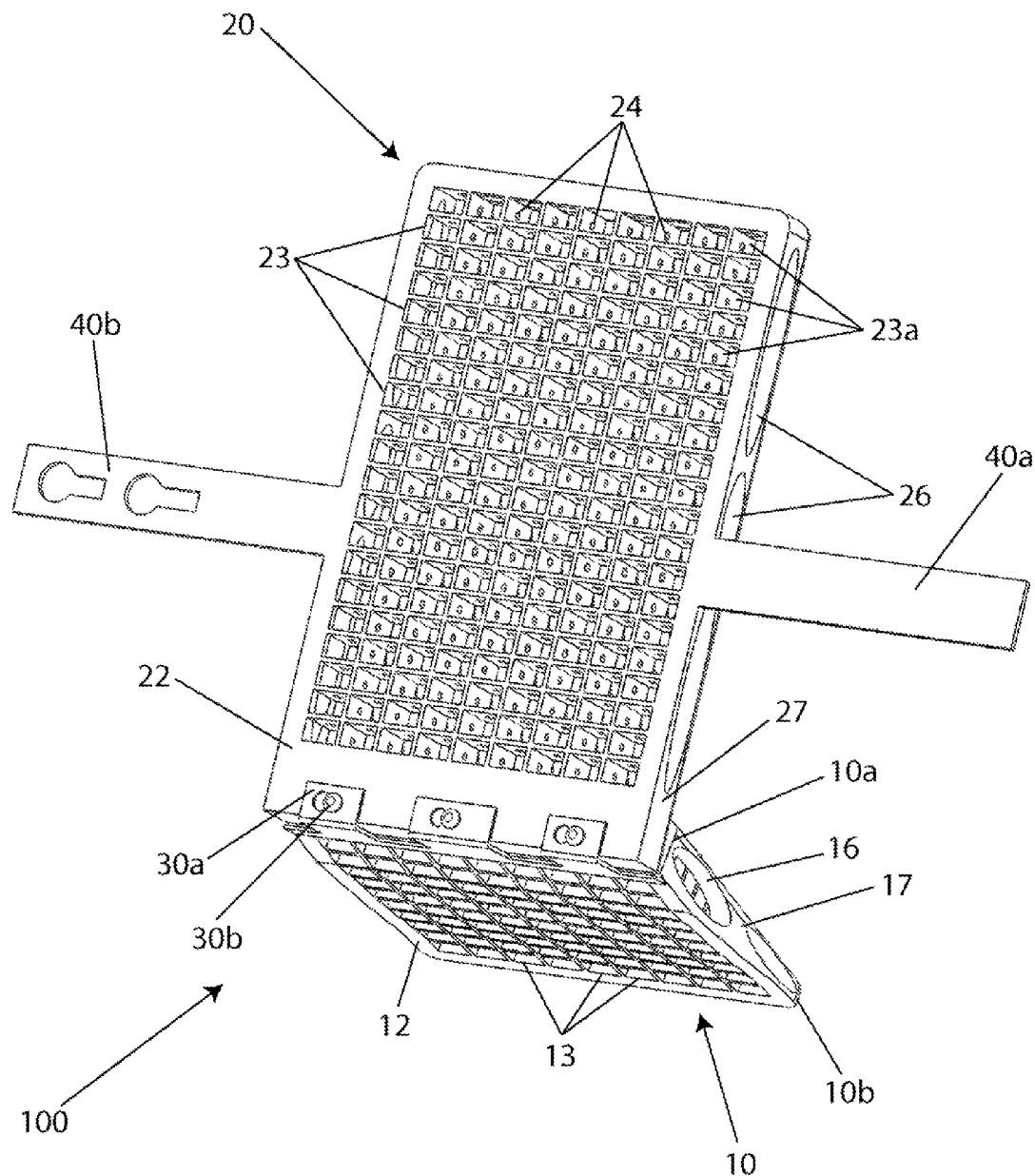
FIG. 2 is a perspective view of the back of the seat pad of the present invention in its assembled state as it would be installed on a typical seat or chair.

As shown in FIGS. 1 and 2, the bottom pad 10 share some similarities with the top pad 20 in that it has multiple large holes 13 that extend from the top face 11 to the bottom face 12. Secondly, every other large hole 13 is covered by a protruded bead 15 that is semi-circular in shape and protrudes from the top face 11. Thirdly, the sidewalls 13a of each large hole 13 have a small hole 14 to allow air to flow between the various large holes 13. Finally, similar to the top pad 20, the bottom pad 10 has multiple side holes 16, which can be long and oval in shape, throughout the side edges. However, the primary difference between the top pad 20 and the bottom pad 10 is that the thickness of the bottom pad 10 varies with the rear portion 10a having a greater thickness than the front portion 10b. The bottom pad 10 may be manufactured as a single piece or a two pieces that attach together to create the varying thickness. It is believed that making the bottom pad 10 out of two pieces will reduce the cost and complexity of the manufacturing process.

Application of the present invention is with seats or chairs of various sorts, including, car seats, truck seats, office chairs, theater seats, stadium seats, and any other seat or chair where a person sits for an extended period of time. However, the preferred embodiment described herein has been configured for use with a car seat. It will be appreciated by those skilled in the art that the principles of this invention may be applied to other types of seats or chairs without departing from the spirit of the present invention.

In order to install the seat pad 100 of the present invention the bottom pad 10 must first be attached to the top pad 20. The seat pad 100 of the present invention contains an attachment mechanism 30a and 30b that holds the bottom pad 10 to the top pad 20. The attachment mechanism 30a and 30b can be a belt loop, Velcro, a strap, a tie wrap, buttons, a zipper, or any other mechanism that would ensure the attachment of the top pad 20 to the bottom pad 10. In the preferred embodiment, as shown in FIG. 2, the attachment mechanism used is a plastic belt 30a that is molded to the bottom pad 10 and attached to a hook 30b that is molded on the top pad 20.

Once the top pad 20 and the bottom pad 10 are attached together, the seat pad 100 is placed on a car seat. A strapping mechanism 40a and 40b attached to the top pad 20 is used to strap the seat pad 100 to the car seat. The strapping mechanism 40a and 40b can be a belt, a tie wrap, an elastic band, or any other strapping device that would ensure the seat pad 100 to be strapped on to the car seat so that it does not shift out of place or fall off. In the preferred embodiment, the strapping mechanism used is a plastic belt with a hook that is molded directly to each side of the top pad 20.

With the top pad 20 attached to the bottom pad 10, the seat pad 100 of the present invention is securely strapped on to a car seat with the bottom faces 12 and 22 of the top pad 10 and bottom pad 20, respectively, resting directly against the car seat and the beads 15 and 25 protruding upward and forward, respectively. As a person sits directly on the seat pad 100 of the present invention, the sidewalls 23a of the large holes 23 are flexible enough to provide some cushion but rigid enough to provide support and prevent the seat pad 100 from completely collapsing or being crushed by the weight of the person. The beads 15 and 25 on the bottom pad 10 and the top pad 20 provide some support to the person sitting on the seat pad 100 as well as some acupuncture-type pressure for comfort.

An important aspect of the design of the seat pad 100 of the present invention is its ability to promote airflow that provides a cooling effect of the person sitting on it. Whenever a person sits on a typical seat for any extended period of time, there is a build-up of perspiration on that person's back, upper legs, and rear end. When a person sits on a typical seat, there is no ventilation or airflow within the areas of the person that are in direct contact with the seat. Thus, the person tends to perspire in said areas. However, when the seat pad 100 of the present invention is placed between the person and the seat, air is allowed to flow or ventilate the areas of the person that are in direct contact with the seat pad 100 through the various large holes 13 and 23. As the air within the large holes 13 and 23 are heated by the body temperature of the person sitting on the seat pad 100, the heated air begins to flow through the small holes 14 and 24 until it finds its way completely out through the side holes 16 and 26. At the same time, fresh and cooler air from the outside flows in through the side holes 16 and 26 and through the various small holes 14 and 24 into the various large holes 13 and 23 to ventilate and cool the areas of the person that are in direct contact with the seat pad 100. This type of air flow or ventilation by fresh cool air within the multiple large holes 13 and 23 serves to prevent the build-up of perspiration on that person's back, upper legs, and rear end.

It is significant to note that the seat pad 100 of the present invention does not require a foam pad or cushion of any sort. Such foam pad or cushion placed on top of the seat pad 100 would completely cover the large holes 13 and 23, thus preventing the air flow or ventilation of the person sitting on it. The sidewalls 13a and 23a of the large holes 13 and 23 are designed to provide the desired cushion to the person sitting on it. The thickness of the sidewalls 13a and 23a of the rectangular holes 13 and 23 must be determined depending on the material used for the top pad 10 and bottom pad 20. The sidewalls 13a and 23a must be flexible enough to provide some cushion to the person sitting on the seat pad 100 but rigid enough to prevent the seat pad 100 from being completely collapsed or crushed by the weight of the person. The side edges of both the top pad 10 and the bottom pad 20 are created with more plastic to add to the rigid support of the seat pad 100 so as to serve as a structural frame that keeps the seat pad 100 from being crushed.

Finally, it should also be noted that the attachment mechanism 30a and 30b between the top pad 10 and bottom pad 20 should allow the top pad 10 to vary in angle relative to the bottom pad 20 so as to recline the seat pad 100 as the car seat is reclined or repositioned.

As an alternative embodiment of the present invention, the top pad 10 can also be utilized as a floor pad rather than a seat pad.

It is understood that the described embodiments of the present invention are illustrative only, and that modifications thereof may occur to those skilled in the art. Accordingly, this invention is not to be regarded as limited to the embodiments disclosed, but to be limited only as defined by the appended claims herein.

What is claimed is:

1. A plastic seat pad used on top of a seat or chair comprising:
    a top pad and a bottom pad each having a top face, a bottom face, and at least two side edges;
    said top pad and said bottom pad having a plurality of large holes extending with sidewalls from said top face to said bottom face;
    a plurality of beads that protrude from said top face and that cover half of said large holes in said top pad and said bottom pad;
    a small hole on each of said sidewalls of said large holes;
    a plurality of side holes along each of said side edges of said top pad and said bottom pad;
    attaching means that hold said top pad to said bottom pad; and
    strapping means that hold said plastic seat pad on to said seat or chair.

* * * * *